(12) United States Patent
Ruffa

(10) Patent No.: US 7,415,063 B1
(45) Date of Patent: Aug. 19, 2008

(54) METHOD TO ESTIMATE NOISE IN DATA

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 687 days.

(21) Appl. No.: 11/015,815

(22) Filed: Dec. 20, 2004

(51) Int. Cl.
H04B 3/46 (2006.01)
H04B 1/10 (2006.01)
H04B 17/00 (2006.01)
H04L 1/00 (2006.01)

(52) U.S. Cl. .................................. 375/227; 375/346

(58) Field of Classification Search ............... 375/227, 375/316, 340, 346; 381/71.1, 94.1
See application file for complete search history.

(56) References Cited

U.S. PATENT DOCUMENTS

| | | | |
|---|---|---|---|
| 4,542,987 A | 9/1985 | Hirschfeld | |
| 4,867,558 A | 9/1989 | Leonard et al. | |
| 5,592,282 A | 1/1997 | Hartog | |
| 6,285,446 B1 | 9/2001 | Farhadiroushan | |
| 7,313,167 B2 * | 12/2007 | Yoon et al. | 375/148 |

* cited by examiner

*Primary Examiner*—David B Lugo
(74) *Attorney, Agent, or Firm*—James M. Kasischke; Michael P. Stanley; Jean-Paul A. Nasser

(57) ABSTRACT

A method for estimating uncorrelated noise in a distributed record of data including data samples that represent both signal and noise, provided that the signal is substantially in phase between adjacent data samples. The method begins with dividing the record of data into an even number of equal intervals. The method proceeds compiling a reduced data record by subtracting from every other data sample in the record of data one data sample that is adjacent to it. Finally, the method entails a step of estimating the noise power in the signal relative to the signal power by calculating the standard deviation as a measure of the magnitude of the noise.

3 Claims, No Drawings

METHOD TO ESTIMATE NOISE IN DATA

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of Invention

The invention relates to digital signal processing and, more particularly, to a method for estimating the noise power in some types of data that contains both signal and noise.

(2) Description of the Prior Art

The estimation of noise in the presence of a data signal is a large problem in many forms of communications and signal processing. The use of noise estimation in measurements taken from an array of receiving sensors can considerably enhance signal estimation. Indeed, estimation and statistical inference of noise are central to many disciplines that entail a series of observations, from which it is necessary to draw conclusions, estimate parameters and make forecasts.

Several conventional methods exist to suppress noise including the following:

1) The use of harmonic models.
2) Noise subspace characterization.
3) (FIR) filter modeling.
4) Data averaging.
5) Inter-epoch averaging, and.
6) Wiener filtering.

Nonlinear Time Series. Nonparametric and Parametric Methods, by J Fan and Q Yao, Springer (2003) offers a good overview of these conventional methods to handle nonlinear time series. Unfortunately, all the foregoing techniques suffer from at least one of the following limitations: the need for extended data acquisition, assumption of limited epoch-to-epoch variability, dependence on assumptions about the signal characteristics, and the inability to use conventional statistical approaches.

Data averaging is perhaps the most practical and widely used approach for estimating and reducing the noise with respect to the signal. For example, United States Patent Application 2004/0097802 by Cohen filed May 20, 2004 shows a method and apparatus for reducing contamination of an electrical signal. The electrical signal is digitized and averaged to obtain an estimated contaminating signal that is subtracted from the digitized electrical signal. This method is shown in the context of electrophysiological signals, such as EEG, ECG, EMG and galvanic skin response, and for elimination of noise associated with methods such as MRI.

To summarize the general approach to noise estimation by averaging, we start with the assumption that we have a data record comprising a group of data samples. A data record is usually divided into N equal intervals. If the data takes the form of a time series, each data sample $x(t_i)$ at time intervals consists of a signal $s(t_i)$ that is assumed to be correlated over the total duration of all intervals, and a noise component $n(t_i)$ that is assumed to be uncorrelated between any two intervals. Thus, at time $t_i$ $$x(t_i) = s(t_i) + n(t_i). \quad (1)$$

There are two important statistics involved in the investigation of signal noise. The first is the mean, average, or expected value of a variable. This quantity is often mathematically denoted E(x), where x is a sample of the noise in question and E is called the expectation (average value) of the quantity inside the parentheses. This parameter is usually the signal that is being measured, to which noise is being added. The second statistic is the standard deviation of the noise. This is computed by subtracting the square of the mean from $E(x^2)$ and taking the square root. The standard deviation is a measure of the magnitude of the noise, whatever signal is present. If we have a sequence of N samples, the mean of any sample is denoted $\mu$, where, by definition $$\mu = E(x) = \frac{1}{N}\sum_{i=1}^{N} x(t_i), \quad (2)$$

Let the standard deviations for the signal and noise be denoted by S and $\sigma$, respectively, as follows (when both the signal and noise have zero means):

$$E(s^2) = \frac{1}{N}\sum_{i=1}^{n} s^2(t_i) = S^2 \quad (3)$$

and $$E(n^2) = \frac{1}{N}\sum_{i=1}^{N} n^2(t_i) = \sigma^2 \quad (4)$$

If the signal is correlated between any two samples, and the noise is uncorrelated between any two samples (and the signal and noise have zero means), then $$\frac{1}{N}\left(\sum_{i=1}^{N}(s(t_i)+n(t_i))\right)^2 = \frac{1}{N}\sum_{i=1}^{N}\sum_{j=1}^{N} s(t_i)s(t_j) + \frac{1}{N}\sum_{i=1}^{N}\sum_{j=1}^{N} n(t_i)n(t_j) \quad (5)$$
$$= NS^2 + \sigma^2.$$

The signal-to-noise ratio is thus improved over that in each individual data sample by a factor N. It should be noted that a simple average as described above is not the only mechanism for "averaging out" noise. Other examples are weighted averages, moving averages, and moving-weighted averages. Underlying the application of averaging is a trade-off between the degree of certainty achieved and the number of samples that must be taken (and the time it takes to obtain them). It would be greatly advantageous to provide a more practical and efficient estimate of uncorrelated noise in data that achieves a high degree of certainty in a minimum number of samples.

SUMMARY OF THE INVENTION

Accordingly, it is an object of the present invention to provide a method for estimating the noise power in data samples that represent both signal and noise, provided that the signal is substantially in phase in adjacent data samples to be subtracted out, and to do so with a high degree of certainty in a minimum number of samples.

It is another object of the invention to provide a method for estimating the noise power in data samples as described above that has utility across a wide variety of data sampling applications in which noise estimation is important, such as distributed temperature measurements, acoustic measurements, optical measurements, electrical measurements, and the like.

According to the above-described and other objects, the present invention is a method for estimating noise in a time $t_i$ distributed record of data (or a spatially distributed record) including data samples $x(t_i)$ that represent both signal $s(t_i)$ and noise $n(t_i)$ provided that the signal is substantially in phase between adjacent data samples. The method begins with a first step of dividing the entire record of data into an even number of equal intervals 2N.

The method proceeds to a second step of compiling a reduced data record $Y_i$, $Y_1 \ldots Y_2$ by subtracting from every other data sample in said entire record of data by one data sample that is adjacent to it as follows.

$Y_1 = x(t_1) - x(t_2);$ $Y_2 = x(t_3) - x(t_4);$ $Y_3 = x(t_5) - x(t_6);$ or, in general $Y_i = x(t_{2i-1}) - x(t_{2i}).$ (6)

Finally, the method entails a third step of estimating the noise power in the signal relative to the signal power by calculating the standard deviation as a measure of the magnitude of the noise, as follows:

$$E(Y^2) = \frac{1}{2N} \sum_{i=1}^{N} (x(t_{2i-1}) - x(t_{2i}))^2 \qquad (7)$$

$$= \frac{1}{2N} \sum_{i=1}^{N} (s(t_{2i-1}) - s(t_{2i}))^2 +$$

$$\frac{1}{2N} \sum_{i=1}^{N} (n^2(t_{2i-1}) - 2n(t_{2i-1})n(t_{2i}) + n^2(t_{2i}))$$

$$= \sigma^2.$$

Note that the signal terms disappear because it is substantially in phase between two adjacent times, and the cross terms disappear in the above equation because the noise in adjacent samples is assumed independent.

Alternatively, the method can be used on an appropriate data record of 2N receivers having some arbitrary spatial distribution (either as a line array or some more general two-dimensional or three-dimensional distribution). Here, receiver i measures a signal $x_i(t)$ at time t. The method consists of first forming the data record $Y_1 = x_1(t) - x_2(t);$ $Y_2 = x_3(t) - x_4(t);$ $Y_3 = x_5(t) - x_6(t);$ or, in general $Y_i = x_{2i-1}(t) - x_{2i}(t).$ (8)

The noise would then be estimated by the following step:

$$E(Y^2) = \frac{1}{2N} \sum_{i=1}^{N} (x_{2i-1}(t) - x(t_{2i}))^2 \qquad (9)$$

$$= \frac{1}{2N} \sum_{i=1}^{N} (s_{2i-1}(t) - s(t_{2i}))^2 +$$

-continued $$\frac{1}{2N} \sum_{i=1}^{N} (n_{2i-1}^2(t) - n_{2i-1}(t)n_{2i}(t) + n_{2i}^2(t))$$

$$= \sigma^2.$$

Here the noise variance is estimated at a single time t and can be further averaged over all measurement time steps for a more accurate estimate.

DETAILED DESCRIPTION OF THE PREFERRED EMBODIMENT

To estimate the uncorrelated noise in data, the present method begins with a first step of dividing the entire data record into an even number of equal intervals 2N.

The method proceeds to a second step wherein every other data record in a time series is subtracted from the one adjacent to it to form a reduced data record by the following formula:

$Y_1 = x(t_1) - x(t_2);$ $Y_2 = x(t_3) - x(t_4);$ $Y_3 = x(t_5) - x(t_6);$ or, in general $Y_i = x(t_{2i-1}) - x(t_{2i}).$ (10)

or, if the data record represents data from 2N receivers at time t, $Y_1 = x_1(t) - x_2(t);$ $Y_2 = x_3(t) - x_4(t);$ $Y_3 = x_5(t) - x_6(t);$ or, in general $Y_i = x_{2i-1}(t) - x_{2i}(t).$ (11)

The method then proceeds to a third step of estimating the noise power in the signal relative to the signal power. This is accomplished as follows by calculating the standard deviation which is a measure of the magnitude of the noise:

$$E(Y^2) = \frac{1}{2N} \sum_{i=1}^{n} (x(t_{2i-1}) - x(t_{2i}))^2 \qquad (12)$$

$$= \sigma^2,$$

or (for spatially distributed data)

$$E(Y^2) = \frac{1}{2N} \sum_{i=1}^{n} (x_{2i-1}(t) - x_{2i}(t))^2 \qquad (13)$$

$$= \sigma^2.$$

The above-described procedure can thus be used to independently estimate the uncorrelated noise power in the output of many different processes. The only constraint on using the method for a given application is that the signal must be in phase in adjacent data samples to be subtracted out. If the data represents wave-like phenomena (e.g., sound, light, vibration) measured by an array of receivers, it is possible to introduce time delays $\Delta t_s$ so that a given signal appears substantially in phase. The time delay $\Delta t_s$ is used to form a beam $b_s(t)$ according to the formula $$b_s(t) = \sum_{m=1}^{2M} x_m(t) = \sum_{m=1}^{2M} [s_m(t+m\Delta t_s) + n_m(t+m\Delta t_s)], \quad (14)$$

with m index as part of summation, M as the number of receivers, and the reduced data record is formed according to the formula $Y_{1s}(t)=x_1(t+\Delta t_s)-x_2(t+2\Delta t_s);$ $Y_{2s}(t)=x_3(t+3\Delta t_s)-x_4(t+4\Delta t_s);$ $Y_{3s}(t)=x_5(t+5\Delta t_s)-x_6(t+6\Delta t_s);$ or, $Y_{ms}(t)=x_{2m-1}(t+(2m-1)\Delta t_s)-x_{2m}(t+2m\Delta t_s).$ (15)

so that the noise is estimated according to the formula $$E(Y_s^2) = \frac{1}{2M}\sum_{m=1}^{M}(x_{2m-1}(t+(2m-1)\Delta t_s) - x_{2m}(t+2m\Delta t_s))^2 \quad (16)$$
$$= \sigma^2.$$

In addition, it is preferable if the distributed record of data includes data samples that represent a signal that varies slowly over the distribution so that said signal can be assumed constant with good accuracy. Two example applications where this constraint holds true are presented below.

Example 1

Distributed Temperature Measurements

Raman scattering effects were used in an optical fiber to measure the temperature every ½ meter. Typically N is on the order of $10^6$ averages that are made in total time duration of 100 seconds. Each $x(t_i)$ represents a temperature measurement made at a location along the optical fiber at time $t_i$. In each data sample, the signal $s(t_i)$ is either constant or varies slowly over the 100 second measurement duration, so that it can be assumed constant with good accuracy over two adjacent data samples differing in time by $10^{-4}$ seconds. Applying the foregoing method estimates the uncorrelated noise (both electrical and optical) in each measurement. This is especially useful because the temperature often varies from measurement to measurement (which are 100 seconds apart), and yet true transient temperature changes can thus be distinguished from noise.

Example 2

Acoustic Measurements

In this example, an acoustic field is detected by 2M receivers in a phased array receiver system. In practice the receivers may comprise either acoustic (hydrophones or microphones) or electromagnetic arranged in a one-, two- or three-dimensional array. In this example the spatially distributed measurements are made from an array of receivers having a three-dimensional distribution. Here, the data $x_m(t)$ from receiver m is time-delayed so that the signal in each receiver is in phase (and can thus be subtracted out as described above). The beam output $b_s$ associated with a steering delay $\Delta t_s$, is as follows:

$$b_s(t) = \sum_{m=1}^{2M} x_m(t) = \sum_{m=1}^{2M} [s_m(t+m\Delta t_s) + n_m(t+m\Delta t_s)], \quad (17)$$

with S as a signal so that $E(b_s^2)=2MS^2+\sigma^2.$ (18)

Here the expected value is taken over the entire time record t. Because of the time delay, the signal between any two receivers at two different times will be in phase, while the noise will be out of phase in general. Thus, there is a gain in signal-to-noise ratio of 2M.

The noise in each beam is then estimated by subtracting pairs of data samples as follows:

$Y_{1s}(t)=x_1(t+\Delta t_s)-x_2(t+2\Delta t_s);$ $Y_{2s}(t)=x_3(t+3\Delta t_s)-x_4(t+4\Delta t_s);$ $Y_{3s}(t)=x_5(t+5\Delta t_s)-x_6(t+6\Delta t_s);$ or, $Y_{ms}(t)=x_{2m-1}(t+(2m-1)\Delta t_s)-x_{2m}(t+2m\Delta t_s).$ (15)

so that $$E(Y_s^2) = \frac{1}{2M}\sum_{m=1}^{m}(x_{2m-1}(t+(2m-1)\Delta t_s) - x_{2m}(t+2m\Delta t_s))^2 \quad (20)$$
$$= \sigma^2.$$

Note that the noise variance is computed at time t. It can be further averaged over all of the time steps to obtain a more accurate estimate.

This leads to the noise power in each beam relative to the signal power, because each beam corresponds to a unique time delay. Note that in example 1, the distributed record of data represents a time series, while in example 2, it represents spatially distributed measurements. The present method is equally applicable.

It should now be apparent that the above-described method estimates the noise power in distributed data samples that represent both signal and noise, provided that the signal is substantially in phase in adjacent data samples to be subtracted out, and to do so with a high degree of certainty in a minimum number of samples. The method can be applied to a wide variety of data sampling applications in which noise estimation is important, such as distributed temperature measurements, acoustic measurements, optical measurements, electrical measurements, and the like.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

What is claimed is:

1. A method for estimating noise in a distributed record of data including data sampling that representing both signal and noise, providing that the signal is substantially in phase between adjacent data samples, said method comprising the steps of:

dividing the record of data into an even number of equal intervals;

compiling a reduced data record by subtracting from every other data sample in the record of data by one data sample that is adjacent to the every other data sample; and estimating a noise power in the signal relative to a signal power by calculating a variance of the reduced data record;

wherein said step of compiling the reduced data record $Y_i$ is estimated from the record of data by the following formula $$Y_i = x_{2i-1}(t) - x_{2i}(t);$$

here, receiver i measures the signal $x_i(t)$ at time t;

wherein said step of estimating the noise power in the signal relative to the signal power is calculated by calculating the standard deviation as a measure of magnitude of the noise, as represented by the following formula $$E(Y^2) = \frac{1}{2N} \sum_{i=1}^{N} (x_{2i-1}(t) - x_{2i}(t))^2$$

$$= \frac{1}{2N} \sum_{i=1}^{N} (s_{2i-1}(t) - s_{2i}(t))^2 +$$

$$\frac{1}{2N} \sum_{i=1}^{N} (n_{2i-1}^2(t) - n_{2i-1}(t)n_{2i}(t) + n_{2i}^2(t))$$

$$= \sigma^2;$$

wherein $E(Y^2)$ is the expected value of $Y^2$;

wherein the distributed record of data represents measurements from 2N receivers, so that the adjacent data samples are measurements taken at adjacent locations, and said method further comprises the step of imposing time delays so that the signal is substantially in phase;

and wherein the estimate of the noise power is used in recovering received data.

2. A method of estimating noise in a distributed record of data including data samples that represents both signal and noise, provided that the signal is substantially in phase between adjacent data samples, said method comprising the steps of:

dividing the record of data into an even number of equal intervals;

compiling a reduced data record by subtracting from every other data sample in the record of data by one data sample that is adjacent to the every other data sample;

estimating a noise power in the signal relative to a signal power by calculating a variance of the reduced data record; and forming beams with the array of receivers, each beam corresponding to a unique time delay, wherein said noise power estimating step can be accomplished for each beam;

wherein the distributed record of data represents a spatially distributed samples, so that the adjacent data samples are measurements taken at adjacent measurement locations and wherein the spatially distributed measurements are made from and array of receivers having a three-dimensional distribution;

and wherein the estimate of the noise power is used in recovering received data.

3. A method for estimating noise in a distributed record of data including data samples that represents both signal and noise, provided that the signal is substantially in phase between adjacent data samples, said method comprising the steps of:

dividing the record of data into an even number of equal intervals;

compiling a reduced data record by subtracting from every other data sample in the record of data by one data sample that is adjacent to the every other data sample; and estimating a noise power in the signal relative to a signal power by calculating a variance of the reduced data record;

wherein the distributed data of record comprises spatially distributed measurements from an array of receivers in a phased array receiver system;

wherein a time delay $\Delta t_s$ is used to form a beam $b_s(t)$ according to the formula $$b_s(t) = \sum_{m=1}^{2M} x_m(t) = \sum_{m=1}^{2M} [s_m(t + m\Delta t_s) + n_m(t + m\Delta t_s)]$$

with m index as part of summation, M as the number of receivers with s as the signal;

and the reduced data record Y is formed according to the formula $$Y_{ms}(t) = x_{2m-1}(t + (2m-1)\Delta t_s) - x_{2m}(t + 2m\Delta t_s)$$

so that the noise is estimated according to the formula $$E(Y_s^2) = \frac{1}{2M} \sum_{m=1}^{M} (x_{2m-1}(t + (2m-1)\Delta t_s) - x_{2m}(t + 2m\Delta t_s))^2$$

$$= \sigma^2;$$

wherein $x_m(t)$ is the data sample measured at a receiver m;

wherein $E(Y^2)$ is the expected value of $Y^2$;

and wherein the estimate of the noise power is used in recovering received data.

* * * * *